United States Patent
Kaplinger et al.

(10) Patent No.: US 9,959,363 B2
(45) Date of Patent: May 1, 2018

(54) SELF-DOCUMENTATION FOR REPRESENTATIONAL STATE TRANSFER (REST) APPLICATION PROGRAMMING INTERFACE (API)

(71) Applicant: International Business Machines Corporation, Armonk, NY (US)

(72) Inventors: Todd E. Kaplinger, Raleigh, NC (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 14/315,367

(22) Filed: Jun. 26, 2014

(65) Prior Publication Data
US 2015/0378994 A1  Dec. 31, 2015

(51) Int. Cl.
G06F 17/30 (2006.01)
G06Q 30/02 (2012.01)

(52) U.S. Cl.
CPC .... *G06F 17/3092* (2013.01); *G06F 17/30696* (2013.01); *G06F 17/30864* (2013.01); *G06F 17/30867* (2013.01); *G06F 17/30991* (2013.01); *G06Q 30/02* (2013.01)

(58) Field of Classification Search
CPC ......... G06F 17/30864; G06F 17/30867; G06F 17/30991; G06F 17/30696; G06Q 30/02
USPC ....................................................... 707/722
See application file for complete search history.

(56) References Cited

U.S. PATENT DOCUMENTS

| | | | |
|---|---|---|---|
| 7,185,286 B2 | 2/2007 | Zondervan et al. | |
| 7,246,306 B2 | 7/2007 | Chen et al. | |
| 7,480,858 B2 | 1/2009 | Chen et al. | |
| 7,925,691 B2 | 4/2011 | Westphal | |
| 7,930,646 B2 | 4/2011 | De Souza Sana et al. | |
| 8,302,016 B2 | 10/2012 | Goto | |
| 8,448,074 B2 | 5/2013 | Forutanpour et al. | |
| 8,504,681 B1 * | 8/2013 | Cooper .................. | H04L 51/12 709/223 |
| 8,595,186 B1 | 11/2013 | Mandyam et al. | |
| 8,739,126 B2 | 5/2014 | Glaser et al. | |
| 8,856,735 B2 | 10/2014 | Nimashakavi et al. | |

(Continued)

FOREIGN PATENT DOCUMENTS

CN  103049271 A  4/2013

OTHER PUBLICATIONS

U.S. Appl. No. 14/604,806, filed Jan. 26, 2015; Entitled "Mobilizing an Existing Web Application".

(Continued)

*Primary Examiner* — Shahid Alam
*Assistant Examiner* — Andrew N Ho
(74) *Attorney, Agent, or Firm* — Edward J. Wixted, III

(57) ABSTRACT

In an approach for documenting a representational state transfer (REST) resource. A processor monitors input JavaScript Object Notation (JSON) data and output JSON data of a REST resource of an application. A processor converts a set of data from the monitored input JSON data and output JSON data of the REST resource to a self-documenting interchange format. A processor stores the converted set of data from the monitored input JSON data and output JSON data of the REST resource.

8 Claims, 3 Drawing Sheets

(56) References Cited

U.S. PATENT DOCUMENTS

| | | | |
|---|---|---|---|
| 9,047,259 | B1 | 6/2015 | Ho et al. |
| 9,189,244 | B2 | 11/2015 | McMahon et al. |
| 9,230,030 | B2 | 1/2016 | Xue et al. |
| 2003/0051059 | A1 | 3/2003 | Zondervan et al. |
| 2003/0200533 | A1* | 10/2003 | Roberts .............. G06N 5/02 717/124 |
| 2004/0205513 | A1 | 10/2004 | Chen et al. |
| 2008/0046507 | A1 | 2/2008 | Westphal |
| 2008/0201338 | A1* | 8/2008 | Castro ............. G06F 17/3056 707/100 |
| 2008/0228910 | A1 | 9/2008 | Petri |
| 2008/0250394 | A1 | 10/2008 | Jones et al. |
| 2009/0106687 | A1 | 4/2009 | De Souza Sana et al. |
| 2009/0164621 | A1* | 6/2009 | Kothari ............. H04L 43/50 709/224 |
| 2010/0077321 | A1 | 3/2010 | Shen et al. |
| 2010/0161785 | A1 | 6/2010 | Xue et al. |
| 2010/0199197 | A1 | 8/2010 | Faletski et al. |
| 2010/0251128 | A1 | 9/2010 | Cordasco |
| 2011/0099185 | A1* | 4/2011 | Trevor ........... G06F 17/30861 707/756 |
| 2011/0161465 | A1* | 6/2011 | Kowalski ........... H04L 67/2823 709/219 |
| 2012/0060087 | A1 | 3/2012 | Jame et al. |
| 2012/0066601 | A1 | 3/2012 | Zazula et al. |
| 2012/0310899 | A1* | 12/2012 | Wasserman ....... G06F 17/3056 707/687 |
| 2013/0055097 | A1 | 2/2013 | Soroca et al. |
| 2013/0073945 | A1 | 3/2013 | Bingell et al. |
| 2013/0080910 | A1 | 3/2013 | Bingell et al. |
| 2013/0205279 | A1 | 8/2013 | Osminer et al. |
| 2014/0026113 | A1 | 1/2014 | Farooqi |
| 2014/0372970 | A1 | 12/2014 | Broussard et al. |
| 2015/0007128 | A1 | 1/2015 | Yu et al. |
| 2015/0046856 | A1 | 2/2015 | Rucker et al. |
| 2015/0378575 | A1 | 12/2015 | Kaplinger et al. |
| 2015/0378579 | A1 | 12/2015 | Kaplinger et al. |
| 2015/0378684 | A1 | 12/2015 | Kaplinger et al. |
| 2015/0378685 | A1 | 12/2015 | Kaplinger et al. |
| 2015/0378994 | A1 | 12/2015 | Kaplinger et al. |

OTHER PUBLICATIONS

List of IBM Patents or Patent Applications Treated as Related.
Appendix P: List of IBM Patents or Patent Applications Treated as Related, dated Jun. 26, 2014, 2 pages.
Appendix P: List of IBM Patents or Patent Applications Treated as Related, dated Jan. 26, 2015, 2 pages.
Serwatka, "Building native mobile applications with the eZ Publish REST API", eZ Community Knowledge Base :<http://share.ez.no/learn>, The eZ Publish Community Gateway, Oct. 13, 2011, 38 pages.
Serwatka, Lukasz, "Building mobile browser and hybrid applications with eZ Publish", Jul. 7, 2011, eZ Community Knowledge Base, pp. 1-41, Retrieved from http://share.ez.no/learn/ez-publish/building-mobile-browser-and-hybrid-applications-with-ez-publish/(language)/eng-GB on Oct. 16, 2015.
U.S. Appl. No. 14/315,363 entitled "User Interface Element Adjustment Using Web Analytics", filed Jun. 26, 2014.
U.S. Appl. No. 14/315,372 entitled "Mobilize Website Using Representational State Transfer (REST) Resources", filed Jun. 26, 2014.
U.S. Appl. No. 14/315,376 entitled "Mobilizing an Existing Web Application", filed Jun. 26, 2014.
Appendix P List of IBM Patents or Patent Applications Treated as Related.
Ravindranath, et al.; "Procrastinator: Pacing Mobile Apps' Usage of the Network"; MobiSys'14; Jun. 16-19, 2014, ACM, pp. 1-13.
Anubavam; "Website to mobile app"; retrived on Jan. 23, 2014 from website: <http://www.anubavam.com/website-to-mobile-app>.
Anonymous; "Method and System for Rendering Simplified Content Mobile Devices"; An IP.com Prior Art Database Technical Disclosure; IPCOM000204076D; IP.com Electronic Publication: Feb. 10, 2011.
Anonymous; "Mobilizing an Existing Web Application: Method of Runtime Code Adaptation", An IP.com Prior Art Database Technical Disclosure; IPCOM000223897D; IP.com Electronic Publication: Dec. 5, 2012.
Anonymous; "Method and System for Automatically Analyzing a Website for Converting to a Mobile Web Application"; An IP.com Prior Art Database Technical Disclosure; IPCOM000223896D; IP.com Electronic Publication: Dec. 5, 2012.
Anonymous, "Mobilizing an Existing Web Application: Method to Optimize REST Calls in Client for a Mobile Environment"; An IP.com Prior Art Database Technical Disclosure; IPCOM000223898D; IP.com Electronic Publication: Dec. 5, 2012.
Apache CXF; "JAX-RS Services Description"; Retrieved on Jan. 22, 2014 from website: <http://cxf.apache.org/docs/jaxrs-services-description.html>.
Beryozkin; "Musings About Web Services"; Sunday, Oct. 2, 2011; Retrieved from website: <http://sberyozkin.blogspot.com/2011/10/describing-json-services-in-web . . . >.
Buddy Media; "Manage and publish social content using Buddy Media"; Retrieved on Jan. 22, 2014 from website: <http://www.salesforcemarketingcloud.com/sem/buddymedia . . . >.
Careveo; "Using json-schema for exploring API servers"; Jun. 30, 2011, Retrieved from website: <http://shane.caraveo.com/2011/06/30/using-json-schema-for-exploring . . . >.
Chen, et al.; "Coordinated data prefetching for web contents"; Elsevier, Science Direct; copyright 2005 Elsevier B.V.; doi: 10.1016/j.comcom.2005.04.003.
Flynn; "IBM Web Experience Factory: Web Experience Factory"; IBM; Retrieved on Jan. 23, 2014 from website: <http://www-10.lotus.com/ldd/pfwiki.nsf/dx/IBM_Web_Experience_Factory . . . >.
Forge; "The fastest way to build applications, share your software, and enjoy doing it"; JBoss Forge; Retrieved on Jan. 23, 2014 from website: <http://forge.jboss.org/?_sscc=t>.
Gerasika; "How to Convert JSON to XML Using ANTLR"; GerixSoft, Saturday, Jun. 11, 2011; Retrieved from website: <http://www.gerixsoft.com/blog/xslt/json2xml2>.
Gerasika; "How to Convert JSON to XML Using XSLT 2.0"; GerixSoft, Saturday, Jul. 3, 2010; Retrieved from website: <http://www.gerixsoft.com/blog/xslt/json2xml7>.
Golega et al.; "Generating Web Applications from Process Models"; ICWE '06 Workshops; Jul. 10-14, 2006; Palo Alto, CA; Copyright 2006 ACM 1-59593-435—Sep. 6, 2007.
Google Analytics; "Analytics Collection"; last updated Jul. 9, 2013; Retrieved from website: <https://developers.google.com/analytics/devguides/collection/>.
Giunipero; "Creating a Simple Web Application Using MySQL Database"; Retrieved on Jan. 23, 2014 from website: <https://netbeans.org/kb/docs/web/mysql-webapp.html>.
Guest Author; "Paint by Numbers: Guided Design Through Web Analytics"; Dec. 9, 2010; Retrieved from website: <http://blog.sigmamarketing.com/2010/12/paint-by-numbers-guided-design . . . >.
IBM; "IBM Security AppScan"; IBM Software; Retrieved on Jan. 23, 2014 from website: <http://www-03.ibm.com/software/products/en/appscan>.
Jersey; "Extended WADL example for JSON"; Retrieved on Jan. 22, 2014 from website: <http://jersey.576304.n2.nabble.com/Extended-WADL-example-for-JSON>.
Kumar et al.; "A Predicted Region based Cache Replacement Policy for Location Dependent Data in Mobile Environment"; I.J. Communications; Network and System Sciences, 2008; 1: 1-103; Copyright 2008 SciRes.
Paolini; "Web Analytics & Search: What's Happening to My Traffic?"; Jun. 8, 2010; MPThree Consulting Inc.; Retrieved from website: <http://mpaolini.com/web-analytics-the-basics>.
PR Newswire Services; "New Wily 6 Solution Delivers Unmatched End-to-End Web Application Management"; Source is Wily Technology, Inc.; Retrieved on Jan. 23, 2014 from website: <http://www.prnewswire.com/news-releases/new-wily-6-solution-delivers . . . >.
Programmable Web; REST API Design: Put the "Type" in "Content-Type"; Nov. 18, 2011; Retrieved from website: <http://blog.programmableweb.com/2011/11/18/rest-api-design-putting . . . >.

(56) References Cited

OTHER PUBLICATIONS

Serwatka; "Building native mobile applications with eZ Publish REST API"; eZ Community Knowledge Base; <http://share.ez.no/learn>; the eZ Publish Community Gateway.

Stack Overflow; "Create and link XSD to WADL"; Retrieved on Jan. 22, 2014 from website: <http://stackoverflow.com/questions/6168573/create-and-link-xsd-to-a . . . >.

Stack Overflow; "Is it possible to convert web application to mobile application?"; Retrieved on Jan. 23, 2014 from website: <http://stackoverflow.com/questions/743348/is-it-possible-to-convert . . . >.

Tiggzi, "Tiggzi—Features"; Product website; Retrieved on Jan. 23, 2014 from website: <https://web.archive.org/web/20130329010933/http://tiggzi.com/features#>.

Veracode; "Vulnerability Scanning Tools"; Copyright 2006-2013 Veracode Inc.; Burlington, MA; Retrieved from website: <http://www.veracode.com/security/vulnerability-scanning>.

Verborgh; "Easy restfull JAX-RS webservices and extended WADL on Glassfish v3 (using ant.)"; Nov. 21, 2009; Retrieved from website: <http://www.verborgh.be/articles/2009/11/21/easy-restfull-jax-rs-webservices . . . >.

Wikipedia; "List of graphical user interface builders and rapid application development tools"; Retrieved on Jan. 23, 2014 from website: <http://en.wikipedia.org/w/index.php?title=List_of_user_interface . . . >.

Wikipedia; "Web log analysis software"; Retrieved on Jan. 22, 2014 from website: <http://en.wikipedia.org/w/index.php?title=Web_log_analysis_software . . . >.

Zucker; "What is "Integrated Analytics"?"; Bridgeline Software; Whitepaper; Copyright 2009 Bridgeline Software Inc.; Woburn, MA.

Machi: "dojox.analytics"; dojo; dojo.analytics—The Dojo Toolkit—Reference Guide; Printed Jan. 22, 2014; <http://dojotoolkit.org/reference-guide/1.7/dojox/analytics.html#dojox- . . . >.

\* cited by examiner

SELF-DOCUMENTATION FOR REPRESENTATIONAL STATE TRANSFER (REST) APPLICATION PROGRAMMING INTERFACE (API)

FIELD OF THE INVENTION

The present invention relates generally to the field of documentation, and more particularly to documenting representational state transfer (REST) resources using monitored input and output data.

BACKGROUND OF THE INVENTION

Self-documenting is a common descriptor for source code and user interfaces that follow certain loosely defined conventions for naming and structure. These conventions are intended to enable developers, users, and maintainers of a system to use the system effectively without requiring previous knowledge of the system specification, design, or behavior.

Representational state transfer (REST) is a set of principles that define how web standards, such as Hypertext Transfer Protocol (HTTP) and uniform resource identifier (URI), are supposed to be used. REST is intended to evoke an image of how a well-designed web application behaves: presented with a network of webpages, a user progresses through an application by selecting links, or state transitions, resulting in the next page being transferred to the user and rendered for their use. RESTful applications maximize the use of existing, well-defined interfaces and other built-in capabilities provided by the chosen network protocol, and minimize the addition of new application-specific features.

JavaScript™ Object Notation (JSON) is a lightweight data-interchange format. Java and all Java-based trademarks and logos are trademarks or registered trademarks of Oracle and/or its affiliates. JSON is easy for humans to read and write, and for machines to parse and generate. JSON is an open standard format that uses human-readable text to transmit data objects consisting of attribute-value pairs. JSON is used primarily to transmit data between a server and web application, as an alternative to Extensible Markup Language (XML).

Web Application Description Language (WADL) is a resource-centric description language which has been designed to facilitate the modeling, description, and testing of RESTful web applications. WADL models the resources provided by a service and the relationships between them. WADL is intended to simplify the reuse of web services that are based on the existing HTTP architecture of the Web.

SUMMARY

Aspects of an embodiment of the present invention disclose a method, computer program product, and computing system for documenting a representational state transfer (REST) resource. A processor monitors input JavaScript Object Notation (JSON) data and output JSON data of a REST resource of an application. A processor converts a set of data from the monitored input JSON data and output JSON data of the REST resource to a self-documenting interchange format. A processor stores the converted set of data from the monitored input JSON data and output JSON data of the REST resource.

DETAILED DESCRIPTION

Embodiments of the present invention recognize that self-documenting representational state transfer (REST) resources is important for any user writing a client to that interface. Embodiments of the present invention recognize that self-documentation provides a way for a user to more quickly understand a REST application programming interface (API). Java™ API for RESTful Web Services (JAX-RS) is a Java programming language that provides support in creating web services according to the REST architectural pattern. Embodiments of the present invention recognize that the documentation generation feature of JAX-RS provides a way to self-document the REST resources of a website or webpage, using an Extensible Markup Language (XML) based file format called Web Application Description Language (WADL). Embodiments of the present invention recognize that JAX-RS resources that support only JavaScript Object Notation (JSON) user interfaces (UIs) typically do not define a schema for the input and output of the service, rather, JSONObjects or JSONArrays are used. A JSONObject is an unordered collection of name/value pairs. A JSONArray is an ordered sequence of values. Embodiments of the present invention recognize that a solution is required so that JAX-RS services that use JSON objects for input and/or output can self-document using a self-documenting interchange format (e.g., WADL), and accurately reflect the current state of the REST API based on actual usage.

The present invention will now be described in detail with reference to the Figures.

Figure 1:
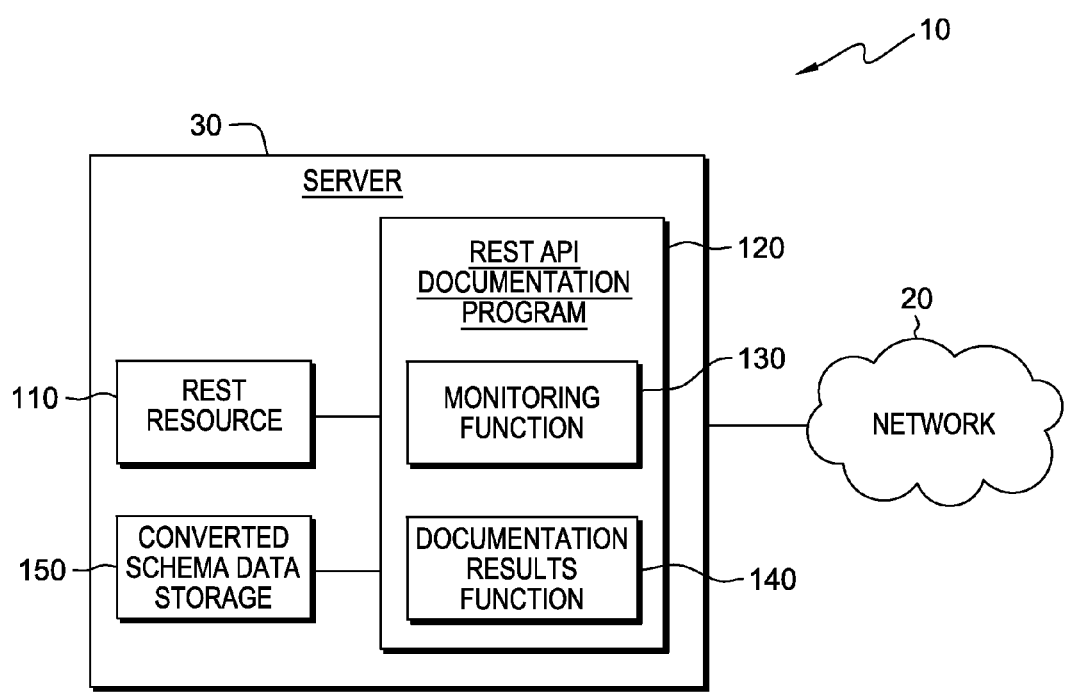
FIG. 1 depicts a diagram of a computing system, in accordance with one embodiment of the present invention.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 30 and network 20. Network 20 may be a local area network (LAN), a wide area network (WAN) such as the Internet, any combination thereof, or any combination of connections an protocols that will support communication between server 30 and computing devices (not shown) accessing REST resource 110, in accordance with embodiments of the invention. Network 20 may include wired, wireless, or fiber optic connections. Computing system 10 may include additional computing devices, servers, computers, or other devices not shown.

Server 30 may be a management server, a web server, or any other electronic device or computing system capable of processing program instructions, and receiving and sending data. In some embodiments, server 30 may be a laptop computer, tablet computer, netbook computer, personal computer (PC), a desktop computer, or any programmable electronic device capable of communicating with other devices (not shown) via network 20. In other embodiments, server 30 may represent a server computing system utilizing multiple computers as a server system, such as in a cloud computing environment. Server 30 contains REST resource 110, REST application programming interface (API) documentation program 120, monitoring function 130, documentation results function 140, and converted schema data storage 150.

REST resource 110 is a generic REST resource capable of accepting as input, and returning JSON as a means to transmit data. REST resource 110 may be a part of a webpage or web application (not shown). In one embodiment, REST resource 110 resides on server 30. In other embodiments, REST resource 110 may reside on another server or another computing device, provided REST API documentation program 120, monitoring function 130, and/or documentation results function 140 have access to REST resource 110.

REST API documentation program 120 operates to monitor and document information about REST resources, such as REST resource 110. In one embodiment, REST API documentation program 120 includes monitoring function 130 and documentation results function 140. In one embodiment, REST API documentation program 120 resides on server 30. In other embodiments, REST API documentation program 120 may reside on another server or another computing device, provided that REST API documentation program 120 is accessible to monitoring function 130 and documentation results function 140, and provided REST API documentation program 120 has access to REST resource 110 and converted schema data storage 150.

Monitoring function 130 operates to monitor access and usage of REST resources and interfaces, such as REST resource 110, and to convert and store JSON data as a self-documenting schema format (e.g., XML Schema (XSD)). In one embodiment, monitoring function 130 stores converted data to converted schema data storage 150. In one embodiment, monitoring function 130 is a function of REST API documentation program 120. In some embodiments, monitoring function 130 is a stand-alone program. In one embodiment, monitoring function 130 is stored to server 30. In other embodiments, monitoring function 130 may be stored to another server or another computing device, provided monitoring function 130 has access to REST resource 110 and converted schema data storage 150.

Documentation results function 140 operates to retrieve and insert converted schema data associated with a particular REST resource or web application into REST resource documentation. Documentation results function 140 also operates to return resulting documentation to a user or other requesting entity. In one embodiment, documentation results function 140 is a function of REST API documentation program 120. In some embodiments, documentation results function 140 is a stand-alone program. In one embodiment, documentation results function 140 is stored to server 30. In other embodiments, documentation results function 140 may be stored to another server or another computing device, provided documentation results function 140 has access to converted schema data storage 150.

Converted schema data storage 150 may be a repository that may be written and read by REST API documentation program 120, monitoring function 130, and/or documentation results function 140. Monitoring function 130 may convert JSON input/output data to a self-documenting schema format, such as extensible markup language (XML) Schema (XSD), and store the converted data to converted schema data storage 150. In some embodiments, converted data stored to converted schema data storage 150 is stored according to a particular naming convention, or otherwise associated with the web application represented by the applicable REST resource.

Figure 2:
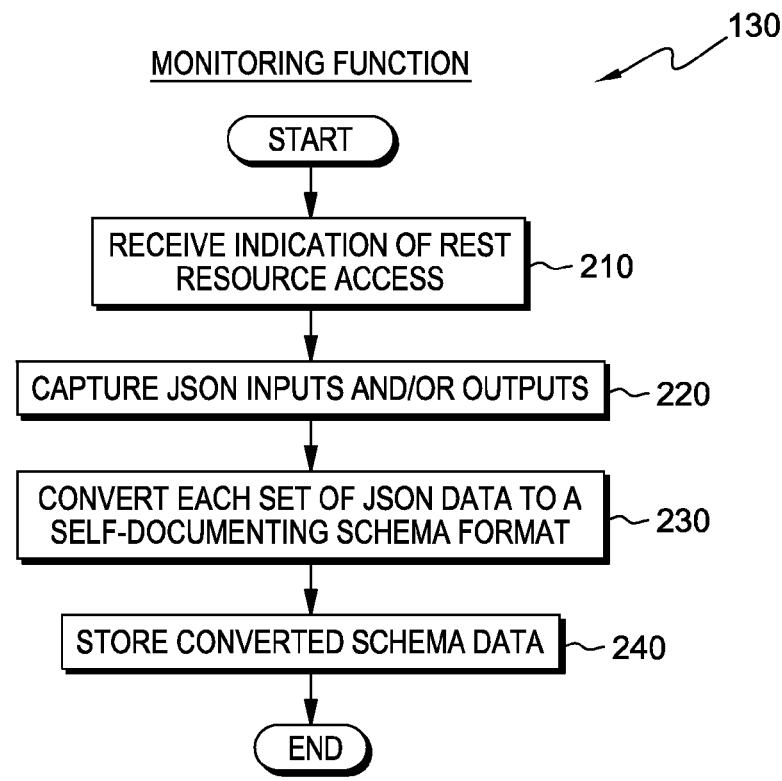
FIG. 2 depicts a flowchart of the steps of a monitoring function executing within the computing system of FIG. 1, for monitoring REST resources and converting JSON input/output data to a self-documenting schema format, in accordance with one embodiment of the present invention.

FIG. 2 depicts a flowchart of the steps of monitoring function 130, a function of REST API documentation program 120, executing within the computing system of FIG. 1, in accordance with an embodiment of the present invention. Monitoring function 130 operates to monitor REST resource usage, capture input and output data, and convert such data into a self-documenting interchange format, and store the converted data.

In one embodiment, initially, a developer creates a webpage, website, or other web-based application that includes at least one REST resource, for example, REST resource 110. In some embodiments, REST resource 110 only supports JSON for the input and output of the service. In embodiments of the present invention, REST resource 110 does not define a schema for the input and output of the service. The webpage, website, or other web-based application that includes the at least one REST resource, for example, REST resource 110, is accessible by REST API documentation program 120 and monitoring function 130, in an embodiment of the present invention.

In step 210, monitoring function 130 receives an indication that REST resource 110 is being utilized, or otherwise accessed. In one embodiment, monitoring function 130 monitors the webpage, website, or other web-based application that includes REST resource 110. In another embodiment, another program or function (not shown) monitors REST resource 110 and sends a notification, or other alert, to monitoring function 130 when REST resource 110 is accessed.

In step 220, monitoring function 130 captures JSON input(s) and/or output(s) from REST resource 110. In one embodiment, monitoring function 130 captures JSON input and output using a JAX-RS/servlet filter. A servlet is a class used to extend the capabilities of a server. Servlets can be used to extend the applications hosted by web servers. A servlet receives a request and generates a response based on that request. In one embodiment, a portion of a JAX-RS/servlet filter is used by monitoring function 130 to capture both JSON input data (via, for example, "String jsonin=getInput (req);") and JSON output data (via, for example, "String jsonout=getOutput(resp);") with regard to REST resource 110. In some embodiments, one or more conditions specify when data is to be captured. For example, conditions may specify only to capture data when the input/output type is JSON, input/output exists, no schema file already exists (or a specified time has passed since a schema file was last created), if the HTTP method used is not OPTIONS or GET, or other possible predefined conditions. An HTTP method indicates the desired action to be performed on the identified resource. A REST resource, such as REST resource 110, may use HTTP methods as verbs to perform actions on the REST resource.

In step 230, monitoring function 130 converts each set of JSON data to a self-documenting schema format. In one embodiment, monitoring function 130 converts each set of JSON data to an XML schema, such as document type definition (DTD), regular language for XML next generation (RELAX NG), XML Schema (XSD), or another self-documenting schema format. In one embodiment, monitoring function 130 converts each set of JSON data to XML, and then converts XML to XSD. In another embodiment, monitoring function 130 converts each set of JSON data to JSON schema, and then converts JSON schema to XSD. In still another embodiment, monitoring function 130 converts each set of JSON data directly to XSD. In some embodiments, monitoring function 130 may implement such a conversion within a JAX-RS/servlet filter to covert both JSON input data (via, for example, "String xsdin=convertToXsd(req, jsonin);") and JSON output data (via, for example, "String xsdout=convertToXsd(req, jsonout);") to XSD.

In step 240, monitoring function 130 stores converted schema data, such that the data is accessible to documentation results function 140. In some embodiments, monitoring function stores converted schema data (e.g., XSD) to a repository, such as converted schema data storage 150. In some embodiments, monitoring function 130 associates stored converted schema data with the webpage, website, or web application that includes REST resource 110. In some embodiments, monitoring function 130 associates stored converted schema data directly with REST resource 110. In some embodiments, a naming convention is used for each converted set of data. In one embodiment, the naming convention used indicates, within the name of the file, the resource name, HTTP method used (e.g., GET, PUT, etc.), and an indication of whether the converted data was input or output with regard to REST resource 110. In one example, the JSON output for an HTTP GET method to a "users" resource may be stored as converted to XSD, according to a naming convention as follows: <resource>_<method>_<input/output>.xsd. In such an example, the specified JSON output would be stored with the filename users_GET_output.xsd.

Figure 3:
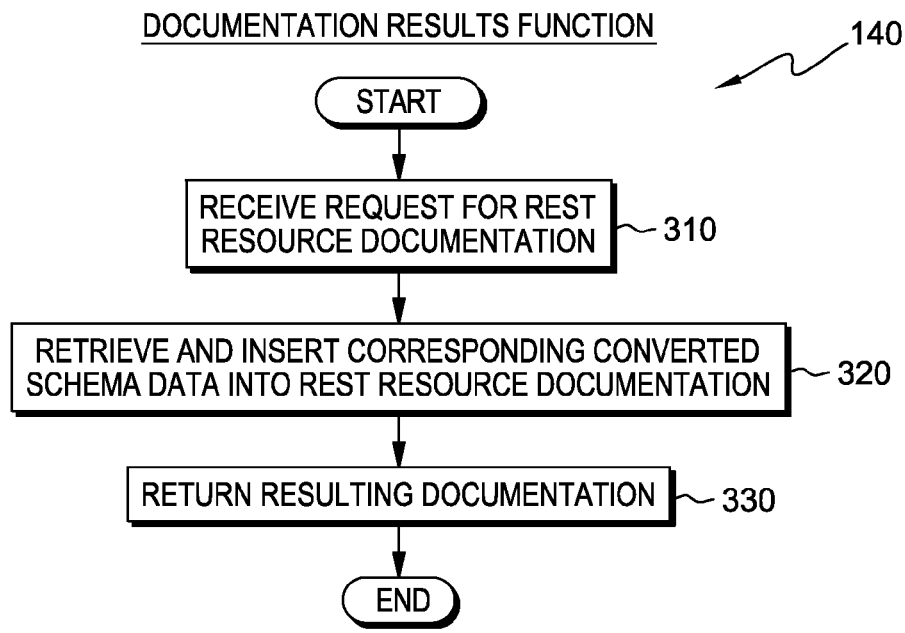
FIG. 3 depicts a flowchart of the steps of a documentation results function executing within the computing system of FIG. 1, for inserting converted schema data into REST resource documentation.

FIG. 3 depicts a flowchart of the steps of documentation results function 140, executing within the computing system of FIG. 1, in accordance with an embodiment of the present invention. Documentation results function 140 operates to retrieve converted schema data, as stored by monitoring function 130, and insert such information into applicable REST resource documentation requested.

In one embodiment, initially, monitoring function 130 has monitored a REST resource, such as REST resource 110, and stored JSON input/output data, as converted, to converted data schema storage 150.

In step 310, documentation results function 140 receives a request for REST resource documentation for a REST resource, such as REST resource 110. In some embodiments, the request for REST resource documentation may specify a format, such as, but not limited to, XML, HyperText Markup Language (HTML), Web Services Description Language (WSDL), WADL, or other formats. In some embodiments, upon receiving a request for REST resource documentation, documentation results function 140 generates the REST resource documentation, according to the specified format. In one specific embodiment, a request for WADL is received with regard to REST resource 110. In one embodiment, a request is received via an HTTP OPTIONS method.

In step 320, documentation results function 140 retrieves converted schema data (e.g., XSD) corresponding to REST resource 110, and inserts the data into the REST resource documentation. In some embodiments, the resulting REST resource documentation is more complete and current than otherwise obtainable documentation about REST resource 110. In some embodiments, documentation results function 140 retrieves corresponding converted schema data from a repository, such as converted schema data storage 150. As previously described, embodiments of monitoring function 130 may cause converted schema data storage to be stored with information indicating the associated REST resource, webpage, website, or other web application. In some embodiments, converted schema data retrieved by documentation results function 140 is inserted into REST resource documentation via a post generation processing technique. For example, if documentation results function 140 receives a request for WADL, corresponding converted schema data (e.g., XSD) may be inserted via a post-WADL generation process. In some embodiments, a JAX-RS/servlet filter is used to implement such insertion. In some embodiments, predefined conditions may exist that specify when corresponding converted schema data shall be inserted into REST resource documentation. For example, predefined conditions may specify to insert converted schema data when an HTTP OPTIONS method is requested, if there is existing and corresponding converted schema data, or other conditions.

In step 330, documentation results function 140 returns the resulting documentation. The provided REST resource documentation, including the inserted corresponding converted schema data, may be utilized to self-document the JSON input and output data for REST resource 110. In some embodiments, documentation results function 140 stores the resulting REST resource documentation to a repository (not shown). In other embodiments, documentation results function 140 causes the resulting REST resource documentation to be returned to the requesting entity or location.

Figure 4:
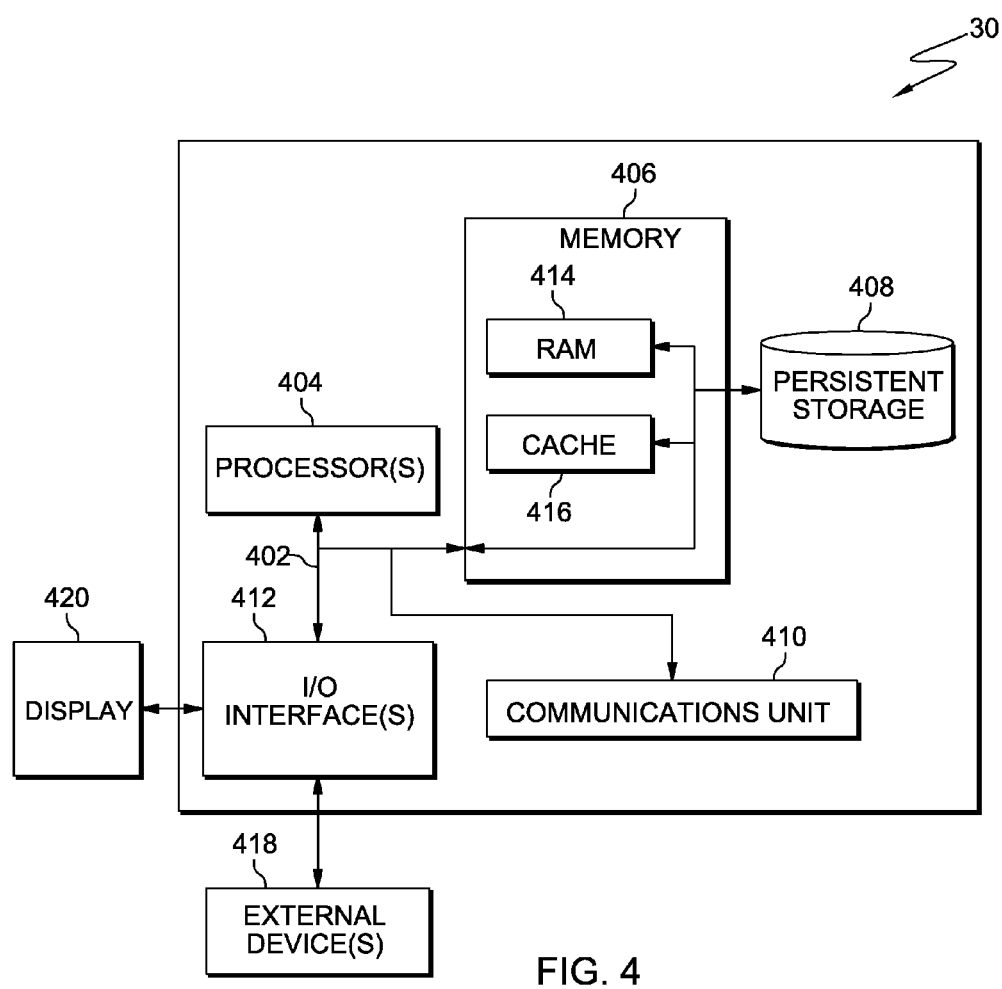
FIG. 4 depicts a block diagram of components of a server within the computing system of FIG. 1, in accordance with one embodiment of the present invention.

FIG. 4 depicts a block diagram of components of server 30 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

REST resource 110, REST API documentation program 120, monitoring function 130, documentation results function 140, and converted schema data storage 150 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. REST resource 110, REST API documentation program 120, monitoring function 130, documentation results function 140, and converted schema data storage 150 may be downloaded to persistent storage 408 through communications unit 410.

I/O interface(s) 412 allows for input and output of data with other devices that may be connected to server 30. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., REST resource 110, REST API documentation program 120, monitoring function 130, documentation results function 140, and converted schema data storage 150, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for documenting a representational state transfer (REST) resource, the method comprising:
   receiving an indication that a REST resource of an application is being accessed;
   externally monitoring, by one or more processors, usage of the REST resource of the application utilizing a JAX-RS/servlet filter, including input JavaScript Object Notation (JSON) data to the REST resource of the application and output JSON data from the REST resource of the application, wherein the REST resource is provided by Java API for RESTful Web Services (JAX-RS);
   determining, by one or more processors, whether a schema file exists for the REST resource of the application;
   responsive to determining that the schema file does not exist, capturing, by one or more processors, a set of data from the monitored input JSON data to the REST resource of the application and the monitored output JSON data from the REST resource of the application;
   converting, by one or more processors, the captured set of data from the monitored input JSON data and output JSON data Extensible Markup Language (XML) Schema (XSD);
   storing, by one or more processors, the converted set of data from the monitored input JSON data and output JSON data;
   receiving a request for documentation for the REST resource;
   retrieving, by one or more processors, the converted set of data from the monitored input JSON data and output JSON data of the REST resource;
   generating, by one or more processors, documentation for the REST resource, wherein the documentation is Web Application Description Language (WADL) format;
   inserting, by one or more processors, the converted set of data from the monitored input JSON data and output JSON data within the documentation for the REST resource; and
   returning, by one or more processors, the documentation with the converted set of data from the monitored input JSON data and output JSON data.

2. The method of claim 1, wherein storing the converted set of data from the monitored input JSON data and output JSON data further comprises:
   associating, by one or more processors, the converted set of data from the monitored input JSON data and output JSON data with the application.

3. The method of claim 1, wherein storing the converted set of data from the monitored input JSON data and output JSON data comprises:
   storing, by one or more processors, the converted set of data from the monitored input JSON data and output JSON data according to a naming convention, wherein the naming convention includes at least a name of the REST resource, a Hypertext Transfer Protocol (HTTP) method, and an indication of the converted set of data is from the monitored input JSON data and output JSON data.

4. A computer program product for documenting a representational state transfer (REST) resource, the computer program product comprising:
   one or more computer readable storage media, wherein the one or more computer readable storage media is not a transitory signal per se, and program instructions stored on the one or more computer readable storage media, the program instructions comprising:
   program instructions to receive an indication that a REST resource of an application is being accessed;
   program instructions to externally monitor usage of the REST resource of the application utilizing a JAX-RS/servlet filter, including input JavaScript Object Notation (JSON) data to the REST resource of the application and output JSON data of a from the REST resource of the application, wherein the REST resource is provided by Java API for RESTful Web Services (JAX-RS);
   program instructions to determine whether a schema file exists for the REST resource of the application;
   program instructions to, responsive to determining that the schema file does not exist, capture a set of data from the monitored input JSON data to the REST resource of the application and the monitored output JSON data from the REST resource of the application;
   program instructions to convert the captured set of data from the monitored input JSON data and output JSON data to Extensible Markup Language (XML) Schema (XSD);
   program instructions to store the converted set of data from the monitored input JSON data and output JSON data;
   program instructions to receive a request for documentation for the REST resource;
   program instructions to retrieve the converted set of data from the monitored input JSON data and output JSON data of the REST resource;
   program instructions to generate documentation for the REST resource, wherein the documentation is Web Application Description Language (WADL) format;

program instructions to insert the converted set of data from the monitored input JSON data and output JSON data within the documentation for the REST resource; and program instructions to return the documentation with the converted set of data from the monitored input JSON data and output JSON data.

5. The computer program product of claim 4, wherein program instructions to store the converted set of data from the monitored input JSON data and output JSON data further comprise:

program instructions to associate the converted set of data from the monitored input JSON data and output JSON data with the application.

6. The computer program product of claim 4, wherein program instructions to store the converted set of data from the monitored input JSON data and output JSON data comprise:

program instructions to store the converted set of data from the monitored input JSON data and output JSON data according to a naming convention, wherein the naming convention includes at least a name of the REST resource, a Hypertext Transfer Protocol (HTTP) method, and an indication of the converted set of data is from the monitored input JSON data and output JSON data.

7. A computer system for documenting a representational state transfer (REST) resource, the computer program product comprising:

one or more computer processors, one or more computer readable storage media, and program instructions stored on the computer readable storage media for execution by at least one of the one or more processors, the program instructions comprising:

program instructions to receive an indication that a REST resource of an application is being accessed;

program instructions to externally monitor usage of the REST resource of the application utilizing a JAX-RS/servlet filter, including input JavaScript Object Notation (JSON) data to the REST resource of the application and output JSON data from the REST resource of the application, wherein the REST resource is provided by Java API for RESTful Web Services (JAX-RS);

program instructions to determine whether a schema file exists for the REST resource of the application;

program instructions to, responsive to determining that the schema file does not exist, capture a set of data from the monitored input JSON data to the REST resource of the application and the monitored output JSON data from the REST resource of the application;

program instructions to convert the captured set of data from the monitored input JSON data and output JSON data to Extensible Markup Language (XML) Schema (XSD);

program instructions to store the converted set of data from the monitored input JSON data and output JSON data;

program instructions to receive a request for documentation for the REST resource;

program instructions to retrieve the converted set of data from the monitored input JSON data and output JSON data of the REST resource;

program instructions to generate documentation for the REST resource, wherein the documentation is Web Application Description Language (WADL) format;

program instructions to insert the converted set of data from the monitored input JSON data and output JSON data within the documentation for the REST resource; and program instructions to return the documentation with the converted set of data from the monitored input JSON data and output JSON data.

8. The computer system of claim 7, wherein program instructions to store the converted set of data from the monitored input JSON data and output JSON data of the REST resource further comprise:

program instructions to associate the converted set of data from the monitored input JSON data and output JSON data of the REST resource with the application.

* * * * *